(12) United States Patent
Oberoi et al.

(10) Patent No.: US 10,549,336 B2
(45) Date of Patent: Feb. 4, 2020

(54) LIMITED ACCESS FASTENER INSTALLATION METHOD

(71) Applicant: The Boeing Company, Chicago, IL (US)

(72) Inventors: Harinder S. Oberoi, Snohomish, WA (US); Kevin M. Barrick, Kingston, WA (US); Branko Sarh, Huntington Beach, CA (US); Alfredo Gerosa, Snohomish, WA (US); Melissa Ann Findlay, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 839 days.

(21) Appl. No.: 15/049,474

(22) Filed: Feb. 22, 2016

(65) Prior Publication Data

US 2017/0239709 A1 Aug. 24, 2017

(51) Int. Cl.

| | |
|---|---|
| *B21J 15/32* | (2006.01) |
| *B21J 15/38* | (2006.01) |
| *B21J 15/02* | (2006.01) |
| *B64F 5/10* | (2017.01) |
| *B21J 15/04* | (2006.01) |
| *B25J 11/00* | (2006.01) |
| *B64C 1/12* | (2006.01) |

(52) U.S. Cl.
CPC ............... *B21J 15/38* (2013.01); *B21J 15/02* (2013.01); *B21J 15/04* (2013.01); *B21J 15/32* (2013.01); *B25J 11/007* (2013.01); *B64C 1/12* (2013.01); *B64F 5/10* (2017.01)

(58) Field of Classification Search
CPC ... B21J 15/38; B21J 15/02; B21J 15/04; B21J 15/32; B64F 5/10; B64C 1/12; B25J 11/007; Y10T 29/49943; Y10T 29/49948
See application file for complete search history.

(56) References Cited

U.S. PATENT DOCUMENTS

| | | | |
|---|---|---|---|
| 3,722,054 A | 3/1973 | Bende et al. | |
| 5,231,747 A | * 8/1993 | Clark | ......................... B21J 15/10 227/152 |

(Continued)

FOREIGN PATENT DOCUMENTS

| | | |
|---|---|---|
| DE | 704344 C | 3/1941 |
| DE | 2358206 A1 | 5/1975 |

(Continued)

OTHER PUBLICATIONS

European Patent Office Search Report, dated Aug. 8, 2017, regarding Application No. 1284P1037EP_CG, 14 pages.

(Continued)

*Primary Examiner* — Sarang Afzali
*Assistant Examiner* — Ruth G Hidalgo-Hernandez
(74) *Attorney, Agent, or Firm* — Yee & Associates, P.C.

(57) ABSTRACT

A method and apparatus for installing a fastener is provided. The apparatus comprises a plate system and an air system that is connected to the plate system. The plate system has a plurality of air passages and at least one opening. The air system directs air through the plurality of air passages, out of the opening, and in a selected direction substantially parallel to a surface of a structure into which a fastener is to be installed such that the air impinges on an exposed portion of a shaft of the fastener.

20 Claims, 16 Drawing Sheets

(56) References Cited

U.S. PATENT DOCUMENTS

| | | | |
|---|---|---|---|
| 2003/0221306 A1 | 12/2003 | Day et al. | |
| 2006/0218780 A1* | 10/2006 | Lewis | B21J 15/10 29/798 |
| 2014/0208592 A1 | 7/2014 | Wright et al. | |
| 2015/0258646 A1 | 9/2015 | Drexler | |
| 2016/0008869 A1 | 1/2016 | Oberoi et al. | |
| 2016/0011593 A1 | 1/2016 | Oberoi et al. | |

FOREIGN PATENT DOCUMENTS

| | | | |
|---|---|---|---|
| DE | 2544872 A1 | 4/1976 | |
| EP | 0502417 A1 | 9/1992 | |

OTHER PUBLICATIONS

Extended European Search Report, dated Dec. 1, 2017, regarding Application No. 16206378.8, 14 pages.
Canadian Office Action, dated Oct. 16, 2019, regarding Application No. 2952689, 4 pages.

\* cited by examiner

LIMITED ACCESS FASTENER INSTALLATION METHOD

BACKGROUND INFORMATION

1. Field

The present disclosure relates generally to installing fasteners. More particularly, the present disclosure relates to a method and apparatus for installing a fastener in a hole of a structure to create a friction force between the fastener and a hole that prevents the fastener from falling out of the hole during installation.

2. Background

Manually installing fasteners in areas within which access is limited may be more difficult and time-consuming than desired. Manual fastener installation may be especially difficult and tedious when building a complex system, such as an aircraft. With some currently available aircraft, the installation of fasteners for longitudinal and radial joint assemblies may be performed manually. For example, without limitation, the installation of rivets for a radial joint assembly for a fuselage assembly of an aircraft may be performed by a first mechanic operating a drilling tool and a hammering tool outside of the fuselage assembly and a second mechanic operating a bucking tool inside of the fuselage assembly.

Consequently, it may be desirable to at least partially automate the process of installing these rivets. However, automating the process of installing rivets may be difficult in limited-access areas within which hundreds of fasteners may need to be installed. Therefore, it would be desirable to have a method and apparatus that take into account at least some of the issues discussed above, as well as other possible issues.

SUMMARY

In one illustrative embodiment, an apparatus comprises a plate system and an air system that is connected to the plate system. The plate system has a plurality of air passages and an opening. The air system directs air through the plurality of air passages, out of the opening, and in a selected direction substantially parallel to a surface of a structure into which a fastener is to be installed such that the air impinges on an exposed portion of a shaft of the fastener.

In another illustrative embodiment, a method for installing a fastener is provided. A fastener is placed within a hole of a structure. Air is directed in a selected direction relative to the fastener with the fastener located in the hole of the structure. The air creates a friction force between the fastener and the hole that prevents the fastener from falling out of the hole. The fastener is installed in the hole.

In yet another illustrative embodiment, a fastener retention system comprises a plate system and an air system connected to the plate system. The plate system comprises a guide plate, a set of cover plates, a padding layer, and a plurality of openings. The guide plate has a contour that matches a surface contour of a surface of a structure. The set of cover plates form a plurality of air passages within the plate system. The padding layer protects a surface of the structure when the plate system is positioned relative to the structure. The plurality of openings pass through the guide plate, the set of cover plates, and the padding layer. An opening in the plurality of openings is configured to be positioned over a hole in a plurality of holes in the structure. The opening allows a fastener inserted in the hole to pass through the opening. The air system directs air through the plurality of air passages within the plate system when the air system is activated to create a friction force between each fastener in a plurality of fasteners and a corresponding hole in the plurality of holes in the structure that prevents each fastener from falling out of the corresponding hole.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
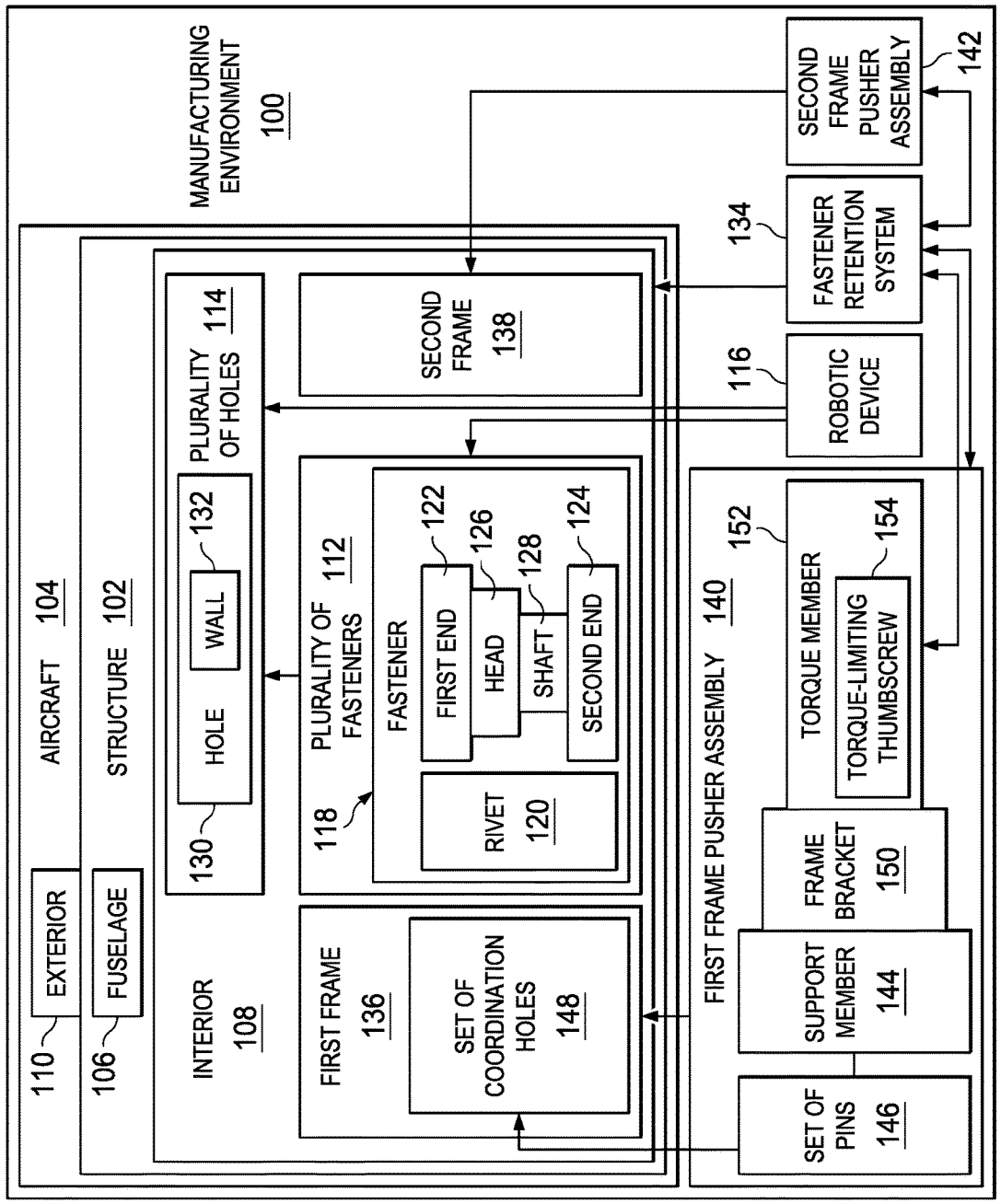
FIG. 1 is an illustration of a manufacturing environment in the form of a block diagram in accordance with an illustrative embodiment.

The illustrative embodiments recognize and take into account different considerations. For example, the illustrative embodiments recognize and take into account that it may be desirable to provide a method and apparatus for creating a friction force that holds fasteners in place within holes in a structure during installation to improve the ease and speed with which these fasteners can be installed. In particular, the illustrative embodiments recognize that this type of method and apparatus may make it easier to automate the process of installing fasteners in areas to which access is limited.

Thus, the illustrative embodiments provide a method and apparatus for installing a fastener. In one illustrative example, a method for installing a fastener is provided. A fastener is placed within a hole of a structure. Air is directed in a selected direction relative to the fastener with the fastener located in the hole of the structure. The air creates a friction force between the fastener and the hole that prevents the fastener from falling out of the hole. Thereafter, the fastener is installed in the hole. In this manner, this method uses air to hold the fastener in the hole prior to and during fastener installation.

In yet another illustrative example, a fastener retention system comprises a plate system and an air system connected to the plate system. The plate system comprises a guide plate, a set of cover plates, a padding layer, and a plurality of openings. The guide plate has a contour that matches a surface contour of a surface of a structure. The set of cover plates form a plurality of air passages within the plate system. The padding layer protects a surface of the structure when the plate system is positioned relative to the structure. The plurality of openings pass through the guide plate, the set of cover plates, and the padding layer. An opening in the plurality of openings is configured to be positioned over a hole in a plurality of holes in the structure. The opening allows a fastener inserted in the hole to pass through the opening. The air system directs air through the plurality of air passages within the plate system when the air system is activated to create a friction force between each fastener in a plurality of fasteners and a corresponding hole in the plurality of holes in the structure that prevents each fastener from falling out of the corresponding hole.

In the illustrative examples described below, the same reference numeral may be used in more than one figure. This reuse of a reference numeral in different figures represents the same element in the different figures.

Referring now to the figures and, in particular, with reference to FIG. 1, an illustration of a manufacturing environment is depicted in the form of a block diagram in accordance with an illustrative embodiment. In this illustrative example, manufacturing environment 100 may be an environment in which structure 102 may be assembled to form aircraft 104.

In one illustrative example, structure 102 takes the form of fuselage 106. In some cases, during manufacturing and assembly, fuselage 106 may be referred to as a fuselage assembly. In one illustrative example, structure 102 may be comprised of two or more parts.

Structure 102 has interior 108 and exterior 110. Interior 108 may be defined by an inner mold line (not shown). Exterior 110 may be defined by an outer mold line (not shown). Plurality of fasteners 112 may be installed in plurality of holes 114 in structure 102. In particular, robotic device 116 may be used to drill plurality of holes 114 into structure 102 and install plurality of fasteners 112. Robotic device 116 may be positioned outside of structure 102 relative to exterior 110 of structure 102. In some illustrative examples, robotic device 116 may enable automation of the entire hole drilling process but automation of only a portion of the fastener installation process.

In this illustrative example, fastener 118 is an example of one of plurality of fasteners 112. When fastener 118 has been fully installed, fastener 118 may take the form of rivet 120. Fastener 118 has first end 122 and second end 124. Fastener 118 may include head 126 located at first end 122 and shaft 128 that extends from second end 124 of fastener 118 to head 126 of fastener 118. Shaft 128 of fastener 118 may also be referred to as a shank in some cases.

In one illustrative example, fastener 118 may be designated for installation in hole 130 of plurality of holes 114 in structure 102. In this illustrative example, hole 130 has wall 132. Wall 132 may define the dimensions of hole 130 and is formed by structure 102.

After plurality of holes 114 have been drilled in structure 102, plurality of fasteners 112 may be inserted into plurality of holes 114 by robotic device 116 at exterior 110 of structure 102. However, the area along interior 108 of structure 102 at which plurality of holes 114 is located may be a limited-access area. Thus, a second robotic device (not shown) may be unable to reach plurality of holes 114 within interior 108 to help in the installation of plurality of fasteners 112. For example, although robotic device 116 at exterior 110 may be used to perform drilling operations and hammering operations, another robotic device (not shown) may be unable to enter the area within interior 108 of structure 102 at which plurality of holes 114 is located in order to perform bucking operations. A human operator may need to perform these bucking operations.

Fastener retention system 134 may be used to hold plurality of fasteners 112 in place within plurality of holes 114 during the installation process. For example, without limitation, fastener retention system 134 may prevent plurality of fasteners 112 from falling out of plurality of holes 114 as robotic device 116 moves along exterior 110 of structure 102 and a human operator (not shown) moves along interior 108 of structure 102 to fully install each of plurality of fasteners 112 one at a time. Fastener retention system 134 is used within interior 108 of structure 102. Fastener retention system 134 is described in greater detail in FIG. 2 below.

With reference still to FIG. 1, plurality of holes 114 may be located between first frame 136 and second frame 138 of structure 102. First frame pusher assembly 140 and second frame pusher assembly 142 may be used to hold and retain fastener retention system 134 in a selected position between first frame 136 and second frame 138. First frame pusher assembly 140 and second frame pusher assembly 142 connect to first frame 136 and second frame 138, respectively.

First frame pusher assembly 140 may include, for example, without limitation, support member 144, set of pins 146, frame bracket 150, and torque member 152. Support member 144 is the primary structural component of first frame pusher assembly 140. Set of pins 146 may be inserted into set of coordination holes 148 in first frame 136 to connect first frame pusher assembly 140 to first frame 136.

Frame bracket 150 may be used to control the positioning of torque member 152. In particular, frame bracket 150 may be movably attached to support member 144. Torque member 152 may be connected to frame bracket 150 such that movement of frame bracket 150 along support member 144 moves torque member 152 relative to support member 144.

Torque member 152 may be used to connect support member 144 indirectly to fastener retention system 134. In one illustrative example, torque member 152 takes the form of torque-limiting thumbscrew 154. Torque-limiting thumbscrew 154 may be rotated to apply a force to fastener retention system 134 that pushes fastener retention system 134 against interior 108 of structure 102 to hold fastener retention system 134 in place.

Second frame pusher assembly 142 may be implemented in a manner similar to first frame pusher assembly 140. However, second frame pusher assembly 142 may be configured to attach to second frame 138.

Figure 2:
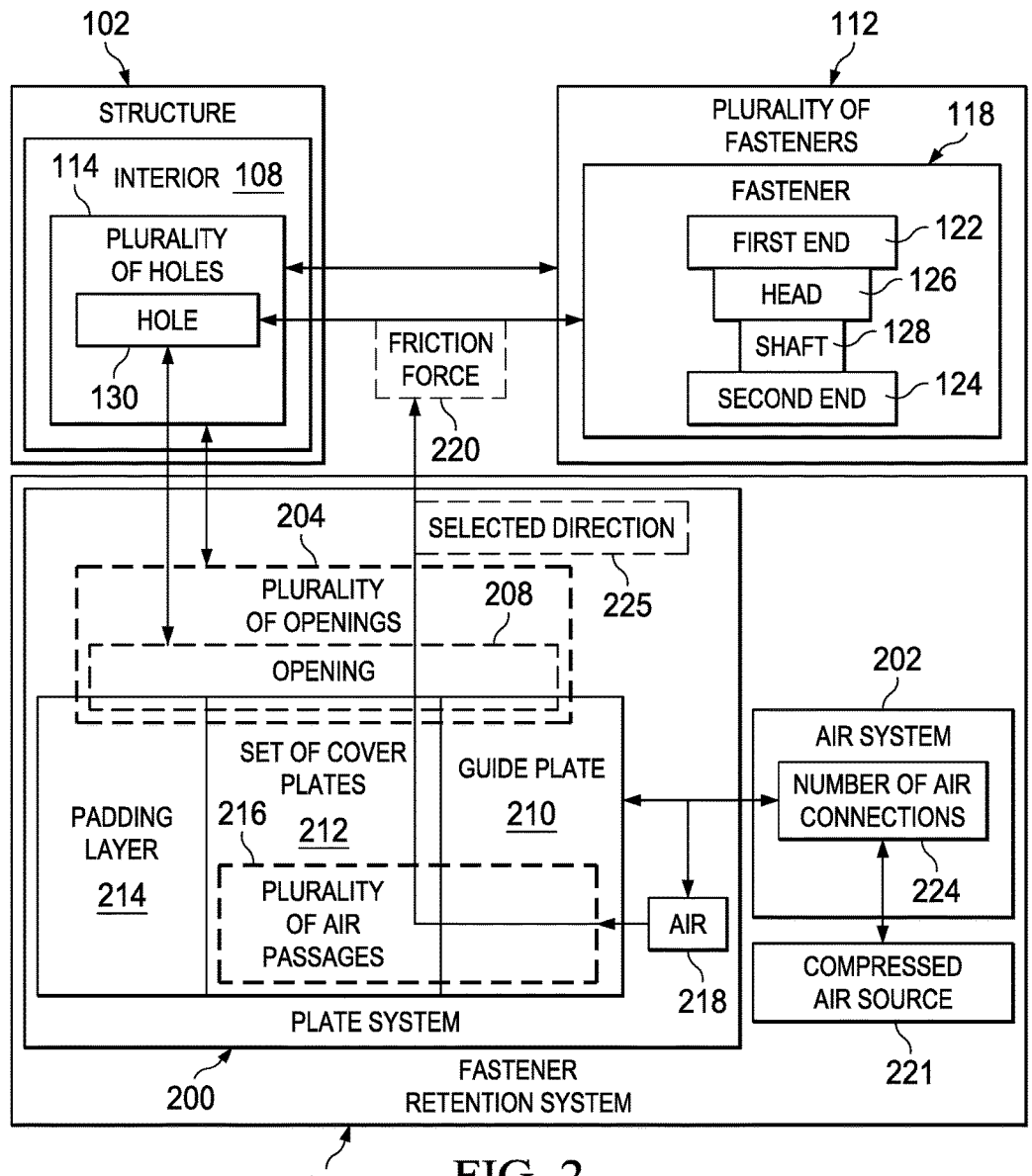
FIG. 2 is an illustration of a fastener retention system in the form of a block diagram in accordance with an illustrative embodiment.

With reference now to FIG. 2, an illustration of fastener retention system 134 is depicted in the form of a block diagram in accordance with an illustrative embodiment. In this illustrative example, fastener retention system 134 may be positioned relative to interior 108 of structure 102. Fastener retention system 134 may be held in place using, for example, first frame pusher assembly 140 and second frame pusher assembly 142 in FIG. 1.

Fastener retention system 134 includes plate system 200 and air system 202 that is connected to plate system 200. Plate system 200 may comprise plurality of openings 204. An opening in plurality of openings 204 may be configured to be positioned over a corresponding hole in structure 102. Further, an opening in plurality of openings 204 may be shaped to allow a fastener that is inserted within the corresponding hole to pass through the opening.

In one illustrative example, when plate system 200 is positioned over plurality of holes 114 in structure 102, opening 208 in plurality of openings 204 may be positioned over hole 130. Opening 208 may be shaped to allow fastener 118 to be easily inserted by robotic device 116 in FIG. 1 into hole 130.

Plate system 200 may include guide plate 210, set of cover plates 212, and padding layer 214. Guide plate 210 may have a contour that matches a surface contour of the surface of interior 108 of structure 102. Set of cover plates 212 may help form plurality of air passages 216 within plate system 200.

In one illustrative example, plurality of air passages 216 is formed between guide plate 210 and set of cover plates 212. In another illustrative example, plurality of air passages 216 is formed within set of cover plates 212.

Padding layer 214 may be used to protect the surface of interior 108 of structure 102 when plate system 200 is positioned relative to structure 102. Plate system 200 may be held in a selected position relative to interior 108 of structure 102 using first frame pusher assembly 140 and second frame pusher assembly 142 from FIG. 1. Padding layer 214 protects the surface of interior 108 of structure 102 when plate system 200 is pushed up against interior 108 by first frame pusher assembly 140 and second frame pusher assembly 142 in FIG. 1.

As depicted, air system 202 may be activated or not activated. When air system 202 is activated, air system 202 sends air 218 into plurality of air passages 216 within plate system 200. Air 218 may be provided by compressed air source 221. In particular, air system 202 may include number of air connections 224 that connect compressed air source 221 to plurality of air passages 216. As used herein, number of air connections 224 includes one or more air connections. Compressed air source 221 may be considered part of air system 202 in some illustrative examples and separate from air system 202 in other illustrative examples.

Plurality of air passages 216 within plate system 200 terminate at plurality of openings 204 such that air 218 flows out from plurality of openings 204. In one illustrative example, robotic device 116 may insert fastener 118 into hole 130 while air system 202 is activated. Air 218 flowing out of opening 208 may create friction force 220 between fastener 118 and hole 130 that prevents fastener 118 from falling out of hole 130.

For example, head 126 of fastener 118 may have a larger diameter than hole 130, but shaft 128 may have a smaller diameter than hole 130. Fastener 118 may be inserted within hole 130, shaft 128 first. Hole 130 may be a clearance fit hole that allows fastener 126 to slip in and out of hole 130. Structure 102 may be configured such that gravity pulls on fastener 118 head 126 first, when fastener 118 is inserted in hole 130. The gravity may cause fastener 118 to fall out of hole 130 without friction force 220.

More particularly, when fastener 118 is positioned in hole 130 such that the force of gravity pulling on head 126 at first end 122 of fastener 118 is greater than the resistance or load near or at second end 124 of fastener 118, fastener 118 may fall out of hole 130. Creating friction force 220 through air 218 may increase this resistance to thus prevent fastener 118 from failing out of hole 130.

In particular, plurality of air passages 216 guide air 218 such that air 218 flows out of opening 208 in selected direction 225. Selected direction 225 may be a direction that is substantially perpendicular to shaft 128 of fastener 118. Air flowing out of opening 208 in selected direction 225 pushes fastener 118 up against a portion of wall 132 of hole 130, which thereby creates friction force 220 sufficient to hold fastener 118 in place relative to hole 130.

In this manner, robotic device 116 may robotically insert each fastener of plurality of fasteners 112 into plurality of holes 114, one by one, while air system 202 is activated, thereby holding the inserted fasteners in place. Robotic device 116 and a human operator using a bucking tool may then perform operations to fully install each fastener of plurality of fasteners 112. In particular, a selected region of structure 102 may be considered clamped up using plate system 200 positioned inside relative to interior 108 of structure 102 and robotic device 116 positioned outside relative to exterior 110 of structure 102 in FIG. 1, thereby facilitating hammering and bucking operations.

The illustrations of manufacturing environment 100 in FIG. 1 and fastener retention system 134 in FIGS. 1-2 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, robotic device 116 may be used to drill plurality of holes 114 in structure 102 prior to fastener retention system 134 being positioned relative to interior 108 of structure 102. In other illustrative examples, robotic device 116 may robotically drill plurality of holes 114 in structure 102 with plate system 200 of fastener retention system 134 positioned relative to interior 108 of structure 102 using first frame pusher assembly 140 and second frame pusher assembly 142. In some cases, only one frame pusher assembly may be needed to hold plate system 200 of fastener retention system 134 in place.

Figure 3:
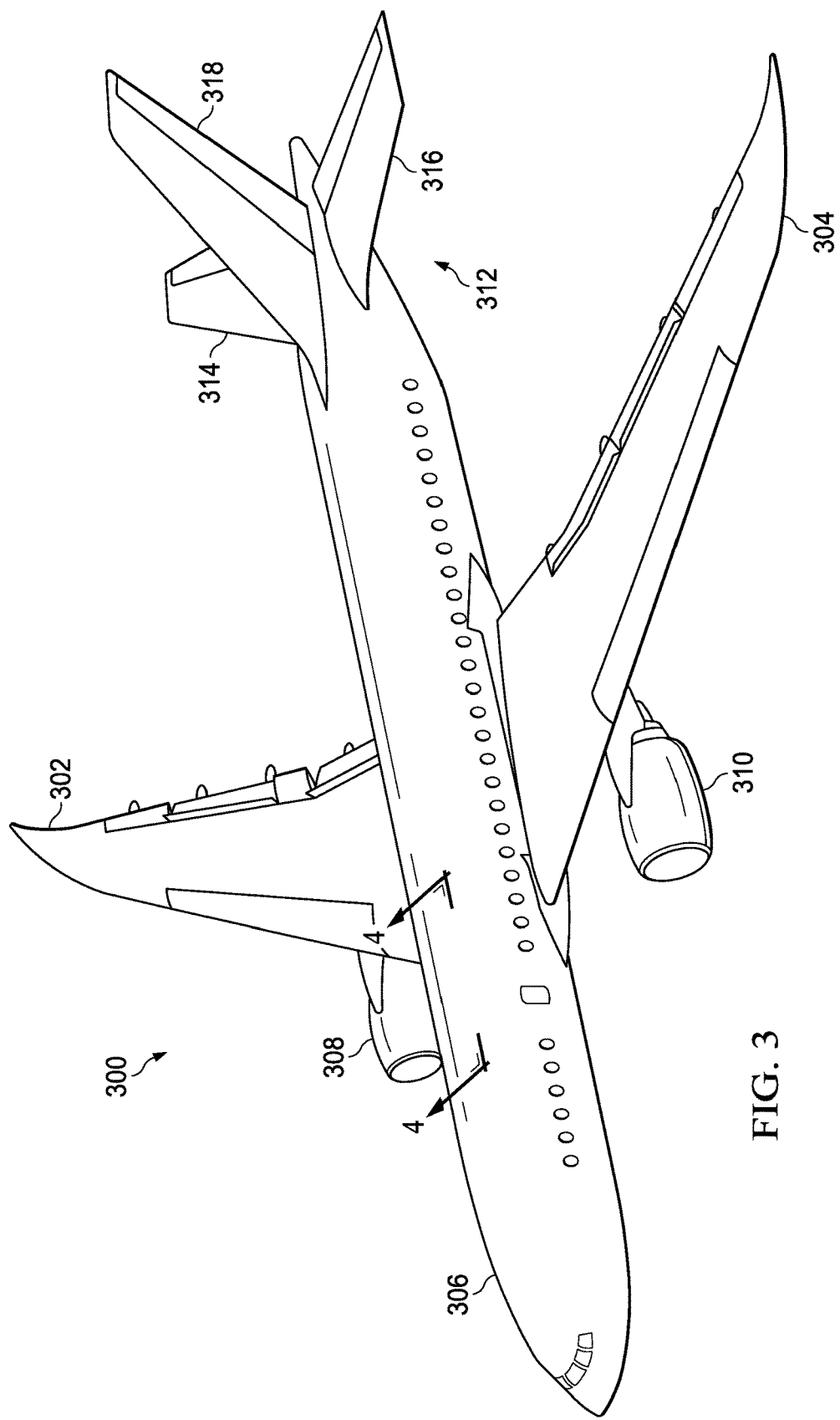
FIG. 3 is an illustration of an isometric view of an aircraft in accordance with an illustrative embodiment.

With reference now to FIG. 3, an illustration of an isometric view of an aircraft is depicted in accordance with an illustrative embodiment. In this illustrative example, aircraft 300 may be an example of one implementation for aircraft 104 in FIG. 1 or a platform that includes an assembly such as structure 102 in FIG. 1.

As depicted, aircraft 300 may include wing 302 and wing 304 attached to fuselage 306. Fuselage 306 may be an example of one implementation for fuselage 106 in FIG. 1. Aircraft 300 may include engine 308 attached to wing 302 and engine 310 attached to wing 304. Fuselage 306 may have tail section 312. Horizontal stabilizer 314, horizontal stabilizer 316, and vertical stabilizer 318 are attached to tail section 312 of fuselage 306.

Figure 4:
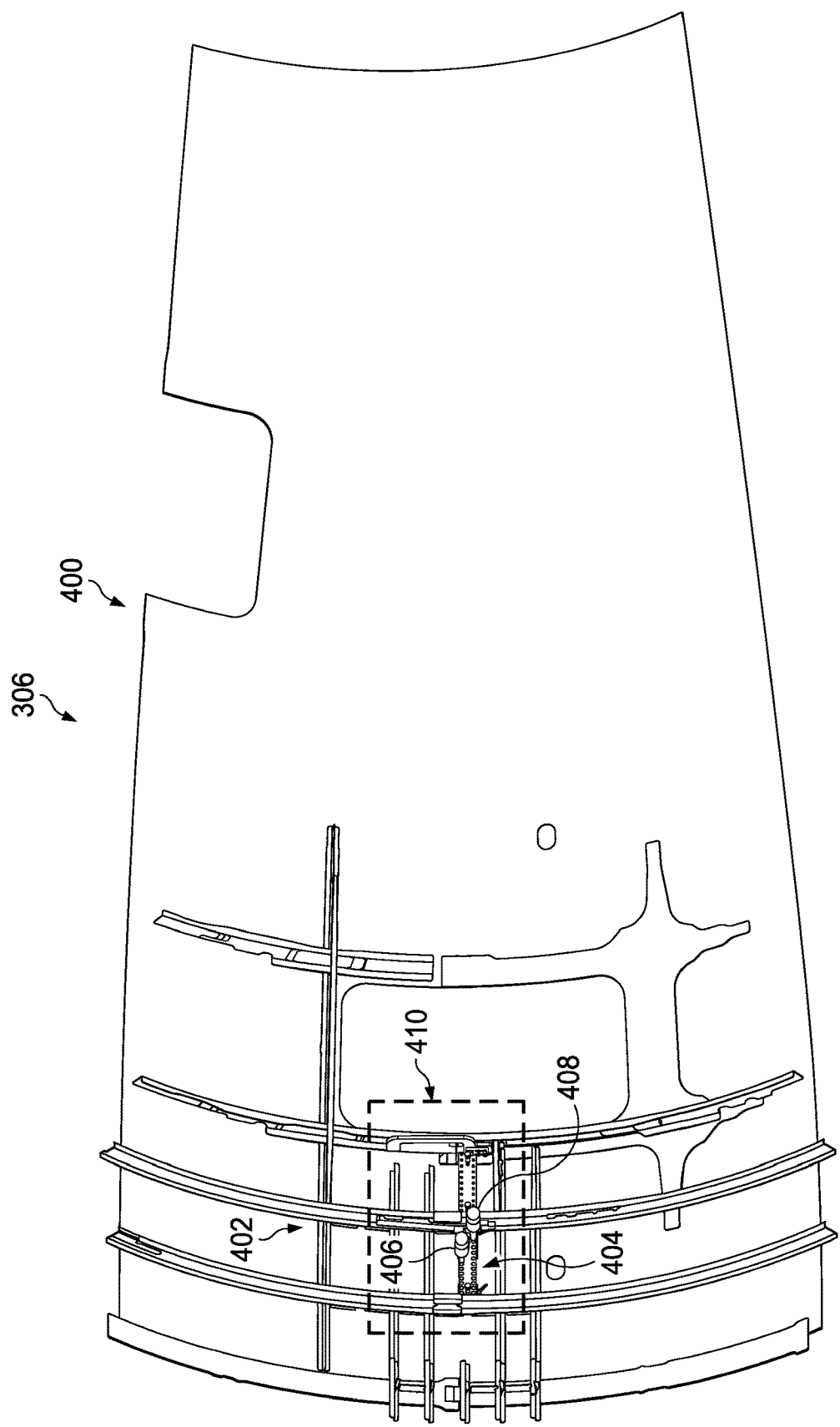
FIG. 4 is an illustration of an isometric view of an inner surface of a portion of the fuselage from FIG. 3 in accordance with an illustrative embodiment.

With reference now to FIG. 4, an illustration of an isometric view of an inner surface of a portion of fuselage 306 from FIG. 3 is depicted in accordance with an illustrative embodiment. In this illustrative example, portion 400 of inner surface 402 of fuselage 306 of aircraft 300 from FIG. 3 is depicted. Portion 400 of inner surface 402 of fuselage 306 may be formed by the inner surface of one or more skin panels. In particular, inner surface 402 of fuselage 306 may be an example of one implementation for interior 108 in FIGS. 1-2.

In this illustrative example, fastener retention system 404 is positioned relative to inner surface 402. Fastener retention system 404 may be an example of one implementation for fastener retention system 134 in FIGS. 1-2. Bucking tool 406 and bucking tool 408 are shown positioned relative to fastener retention system 404. Section 410 of inner surface 402 of portion 400 of fuselage 306 and fastener retention system 404 are shown in greater detail in FIG. 5 below.

Figure 5:
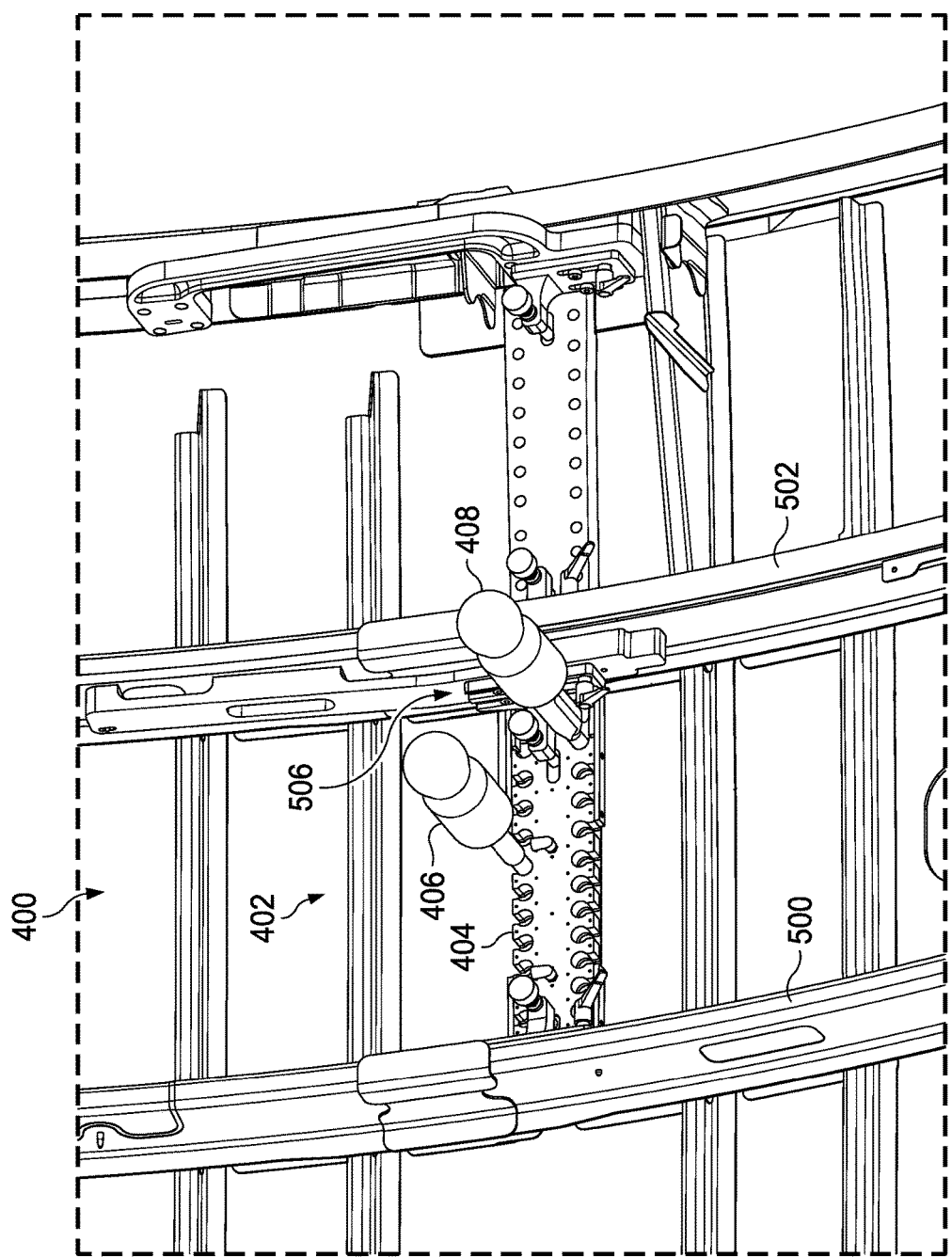
FIG. 5 is an illustration of a section of the inner surface of the portion of the fuselage from FIG. 4 and the fastener retention system from FIG. 4 in accordance with an illustrative embodiment.

With reference now to FIG. 5, an illustration of section 410 of inner surface 402 of portion 400 of fuselage 306 from FIG. 4 and fastener retention system 404 from FIG. 4 is depicted in accordance with an illustrative embodiment. In this illustrative example, fastener retention system 404 is shown positioned between frame 500 and frame 502. Frame 500 and frame 502 may be examples of implementations for first frame 136 and second frame 138, respectively, in FIG. 1.

Figure 6:
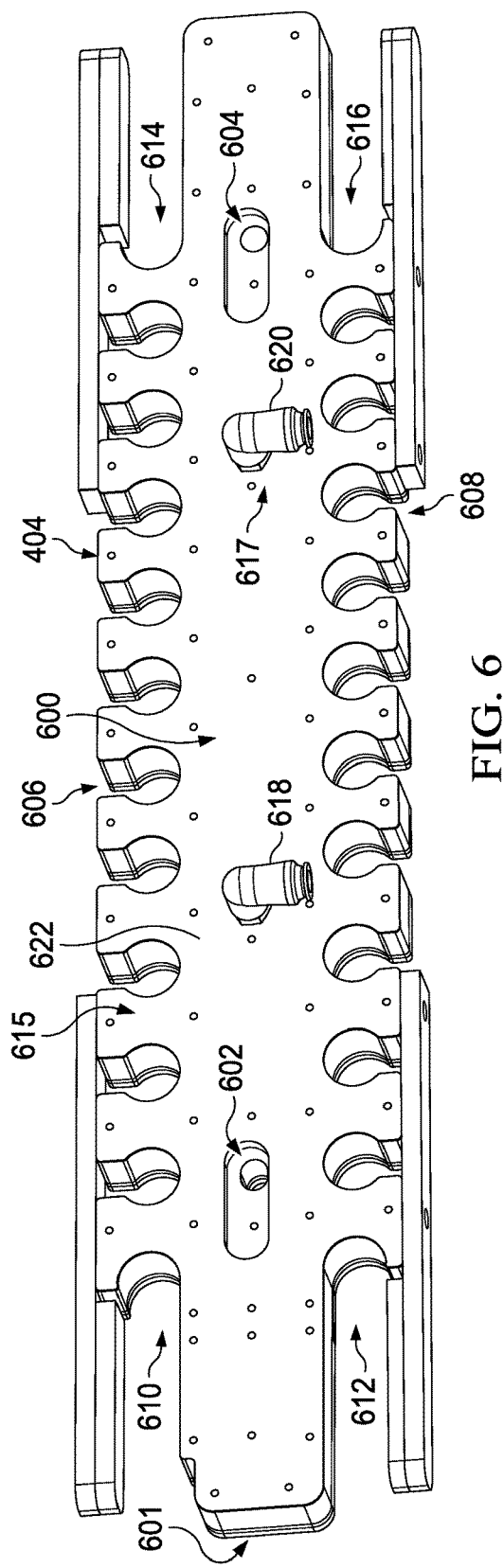
FIG. 6 is an illustration of a first side of the fastener retention system from FIGS. 4-5 in accordance with an illustrative embodiment.

With reference now to FIG. 6, an illustration of a first side of fastener retention system 404 from FIGS. 4-5 is depicted in accordance with an illustrative embodiment. In this illustrative example, fastener retention system 404 has first side 600 and second side 601.

As depicted, fastener retention system 404 includes coordinating hole 602 and coordinating hole 604. These coordinating holes may be used to align fastener retention system 404 with a number of tack fasteners (not shown) positioned around a plurality of holes (not shown) in fuselage 306 from FIG. 4.

Fastener retention system 404 includes first plurality of openings 606 and second plurality of openings 608. In one illustrative example, each of first plurality of openings 606 and second plurality of openings 608 is an example of one implementation for plurality of openings 204 in FIG. 2. In another illustrative example, first plurality of openings 606 and second plurality of openings 608 are an example of one implementation for plurality of openings 204 in FIG. 2. Fastener retention system 404 also includes slot openings 610, 612, 614, and 616.

As depicted, fastener retention system 404 includes plate system 615 and air system 617. Plate system 615 and air system 617 may be examples of implementations for plate system 200 and air system 202, respectively, in FIG. 2.

Air system 617 includes air connection 618 and air connection 620. These air connections may be connected to a compressed air source (not shown) through any number of hoses, tubes, or combination thereof.

When activated, air system 617 may send air from the compressed air source (not shown) into a plurality of air passages (not shown) within plate system 615. Plate system 615 includes guide plate 622, which may be an example of one implementation for guide plate 210 in FIG. 2.

Figure 7:
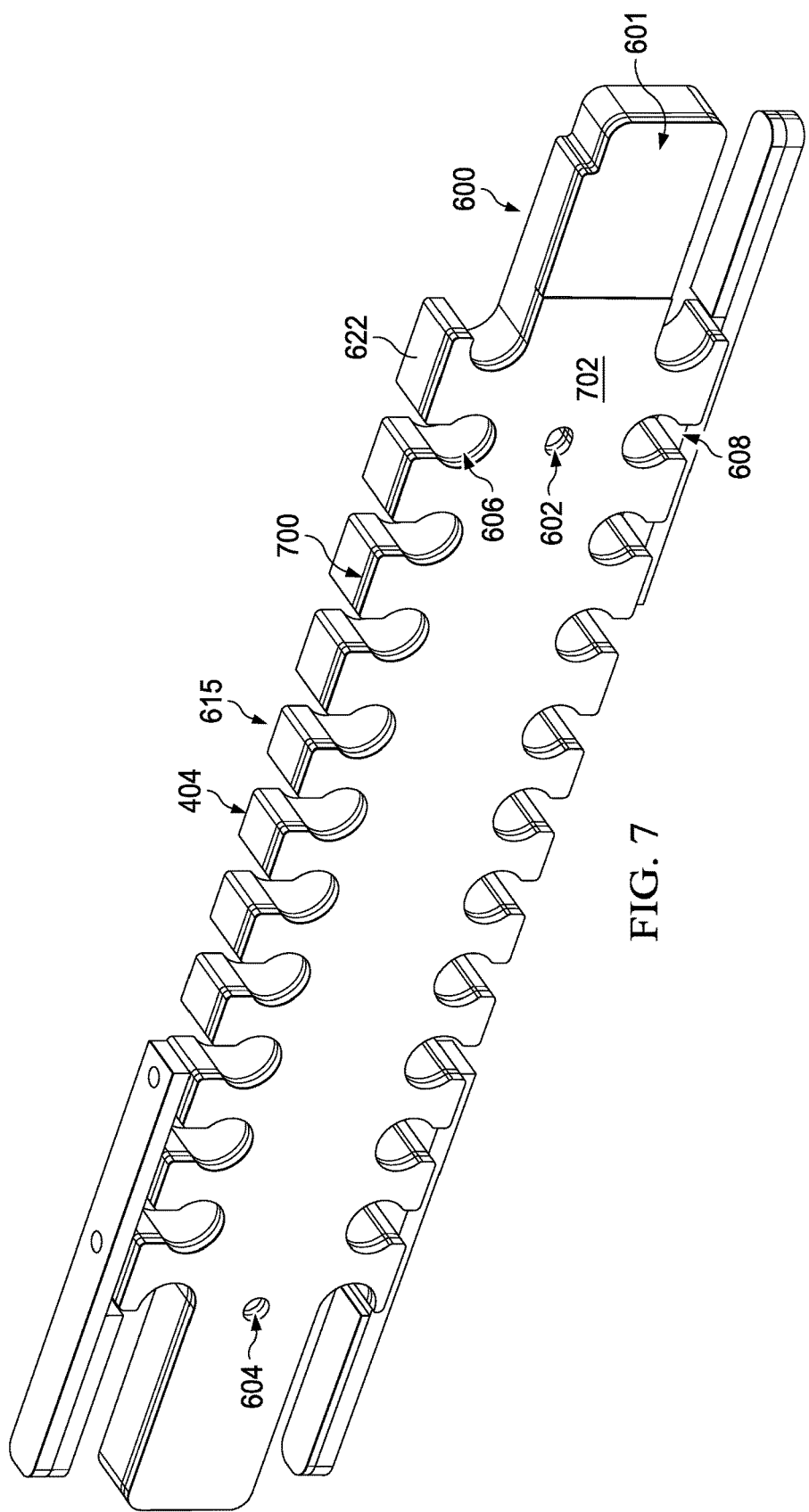
FIG. 7 is an illustration of a second side of the fastener retention system from FIG. 6 in accordance with an illustrative embodiment.

With reference now to FIG. 7, an illustration of a second side of fastener retention system 404 from FIG. 6 is depicted in accordance with an illustrative embodiment. In this illustrative example, second side 601 of fastener retention system 404 may be more clearly seen. As depicted, plate system 615 includes not only guide plate 622, but set of cover plates 700, and padding layer 702. Set of cover plates 700 and padding layer 702 may be examples of implementations for set of cover plates 212 and padding layer 214, respectively, in FIG. 2.

Figure 8:
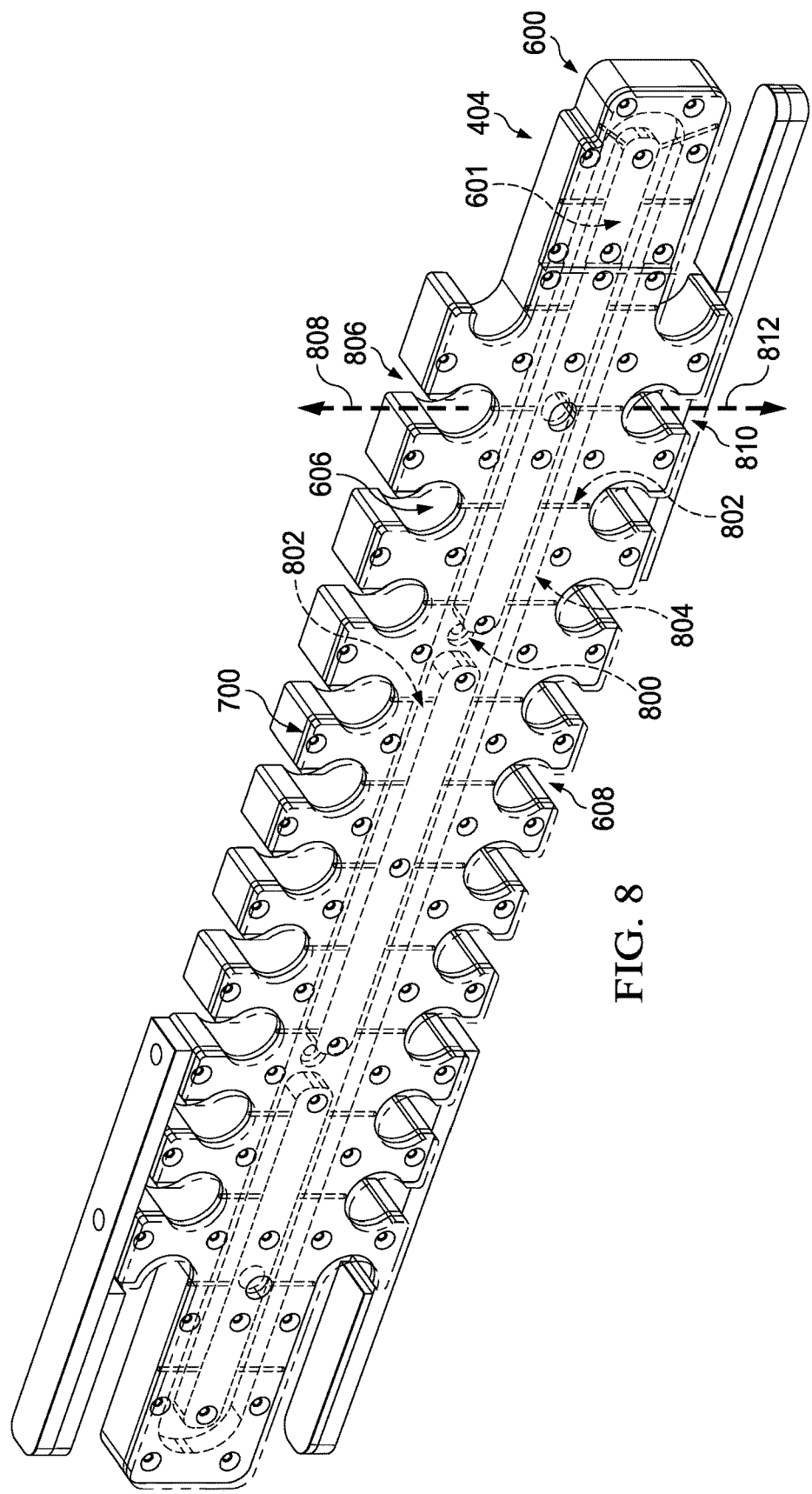
FIG. 8 is an illustration of a second side of the fastener retention system from FIG. 6 with the padding layer from FIG. 7 removed in accordance with an illustrative embodiment.

Turning now to FIG. 8, an illustration of a second side of fastener retention system 404 with padding layer 702 from FIG. 7 removed is depicted in accordance with an illustrative embodiment. With padding layer 702 from FIG. 7 removed in this figure, set of cover plates 700 may be seen. Set of cover plates 700 are shown in phantom to illustrate plurality of air passages 800.

Plurality of air passages 800 may be an example of one implementation for plurality of air passages 216 in FIG. 2. Plurality of air passages 800 includes air passage 802 and air passage 804. Air passage 802 may direct air out to and out from first plurality of openings 606. In particular, air passage 804 is configured such that air flows out of each opening in first plurality of openings 606 in a single direction. As one illustrative example, air (not shown) may flow out of opening 806 of first plurality of openings 606 in selected direction 808.

Similarly, air passage 802 may direct air out to and out from second plurality of openings 608. In particular, air passage 802 is configured such that air flows out of each opening in second plurality of openings 608 in a single direction. As one illustrative example, air (not shown) may flow out of opening 810 of second plurality of openings 608 in selected direction 812. Selected direction 808 and selected direction 812 may be examples of implementations for selected direction 225 in FIG. 2.

Figure 9:
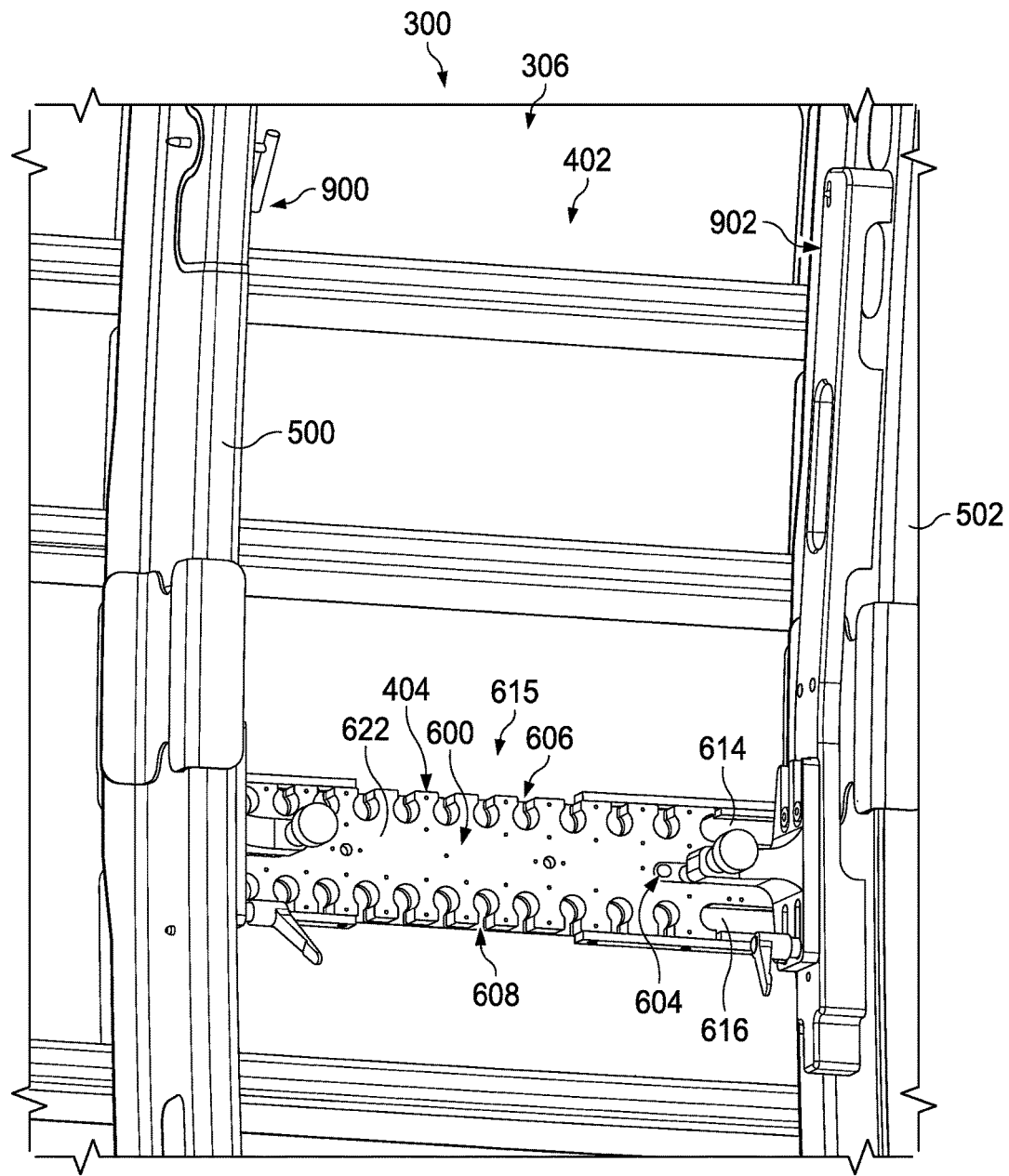
FIG. 9 is an illustration of two frame pusher assemblies holding the fastener retention system from FIG. 6 in a position relative to the interior of the fuselage in FIG. 4 in accordance with an illustrative embodiment.

With reference now to FIG. 9, an illustration of two frame pusher assemblies holding fastener retention system 404 in position relative to inner surface 402 of fuselage 306 is depicted in accordance with an illustrative embodiment. In this illustrative example, frame pusher assembly 900 and frame pusher assembly 902 are used to hold fastener retention system 404 in place relative to inner surface 402. Frame pusher assembly 900 and frame pusher assembly 902 may be example implementations for first frame pusher assembly 140 and second frame pusher assembly 142, respectively, in FIG. 1.

Figure 10:
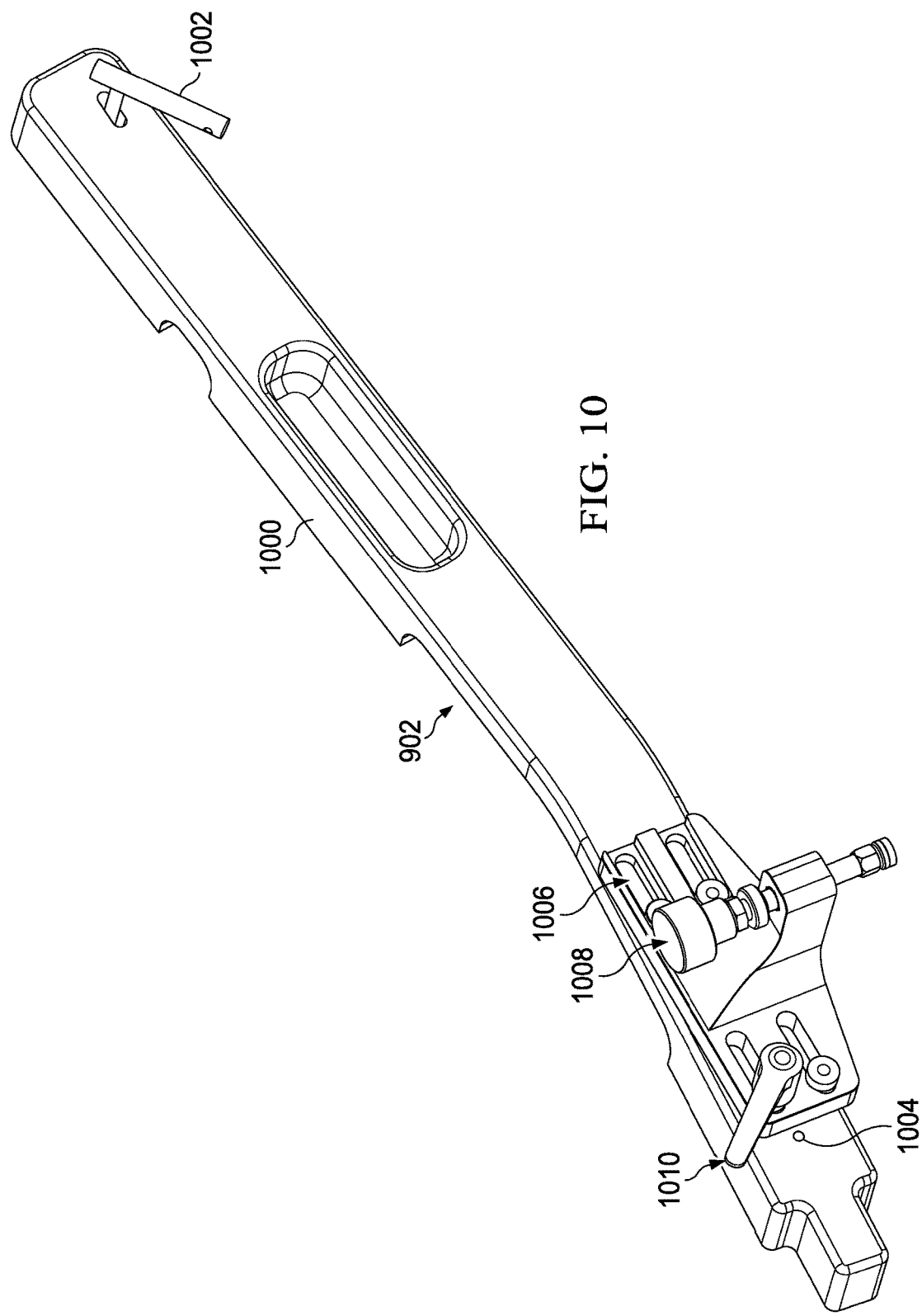
FIG. 10 is an illustration of an isometric view of a frame pusher assembly in accordance with an illustrative embodiment.

With reference now to FIG. 10, an illustration of an isometric view of frame pusher assembly 902 from FIG. 9 is depicted in accordance with an illustrative embodiment. In this illustrative example, frame pusher assembly 902 includes support member 1000, pin 1002, pin 1004, frame bracket 1006, torque member 1008, and adjustment member 1010.

Support member 1000 may be an example of one implementation for support member 144 in FIG. 1. Pin 1002 and pin 1004 may be an example of one implementation for set of pins 146 in FIG. 1. Further, frame bracket 1006 and torque member 1008 may be example implementations for frame bracket 150 and torque member 152, respectively, in FIG. 1.

In this illustrative example, pin 1002 and pin 1004 may be configured for engagement with coordination holes (not shown) in frame 502 in FIG. 9. Pin 1002 and pin 1004, as well as the coordination holes (not shown) may help with the alignment and stabilization of frame pusher assembly 902 with respect to frame 502 in FIG. 9.

Further, torque member 1008 takes the form of a torque-limiting thumbscrew that is configured to engage plate system 615 as seen in FIG. 9. Rotating or applying torque to torque member 1008 causes torque member 1008 to push against plate system 615, thereby pushing plate system 615 up against fuselage 306. The amount of torque that can be applied to torque member 1008 may be limited to prevent plate system 615 from pushing against fuselage 306 in a manner that causes undesired effects on fuselage 306.

Frame bracket 1006 connects torque member 1008 to support member 1000. Adjustment member 1010 may be manipulated to move frame bracket 1006, and thereby torque member 1008, along support member 1000 with a specified range of motion. In this manner, torque member 1008 may be easily positioned relative to fastener retention system 404 in FIG. 9.

Figure 11:
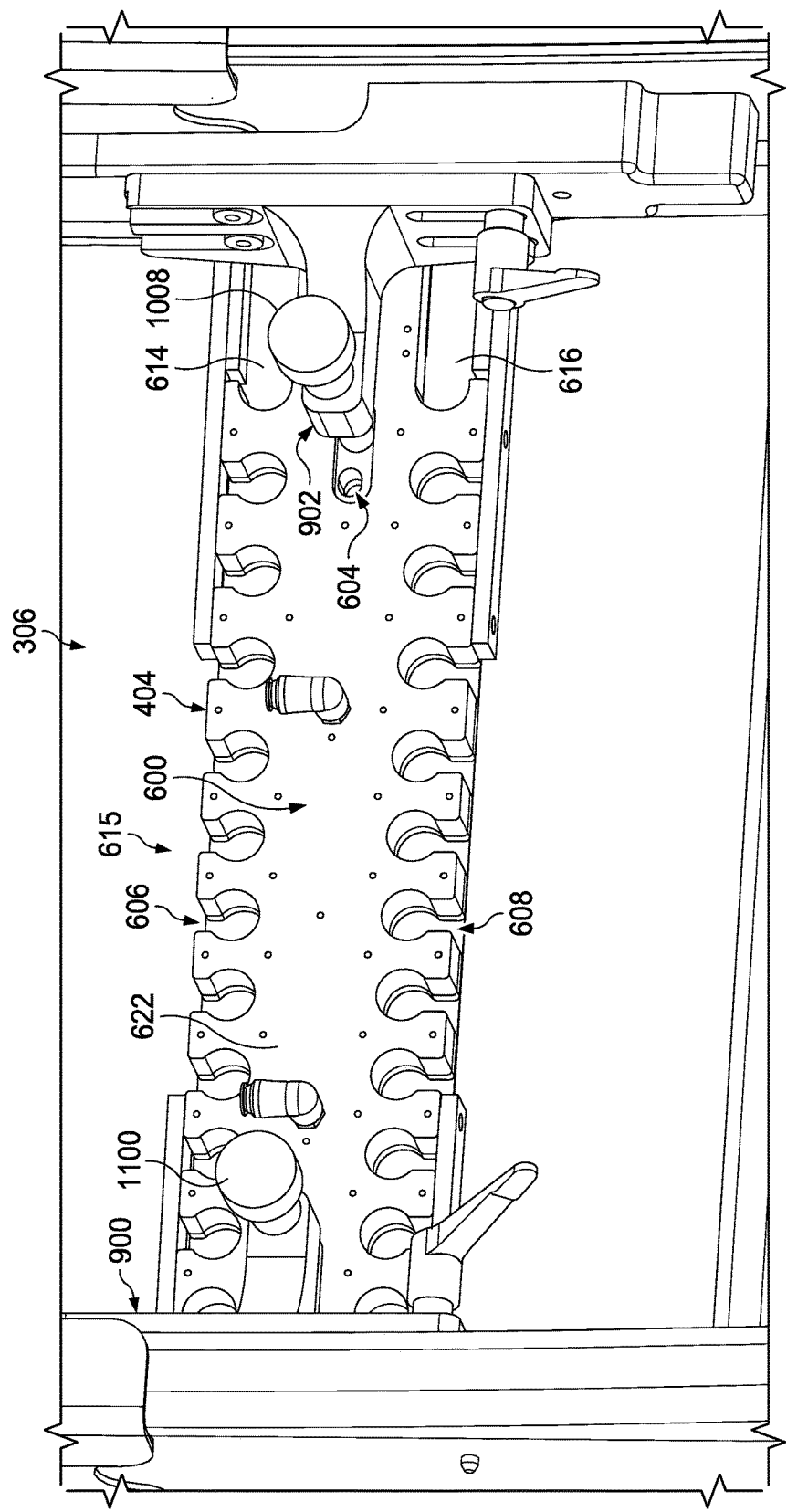
FIG. 11 is an illustration of an enlarged view of the fastener retention system from FIG. 9 in accordance with an illustrative embodiment.

With reference now to FIG. 11, an illustration of an enlarged view of fastener retention system 404 is depicted in accordance with an illustrative embodiment. In this illustrative example, torque member 1008 of frame pusher assembly 902 is shown engaged with plate system 615. Torque member 1100 of frame pusher assembly 902 is also shown engaged with plate system 615. Together, torque member 1008 and torque member 1100 apply force to plate system 615 that pushes plate system 615 up against fuselage 306.

Figure 12:
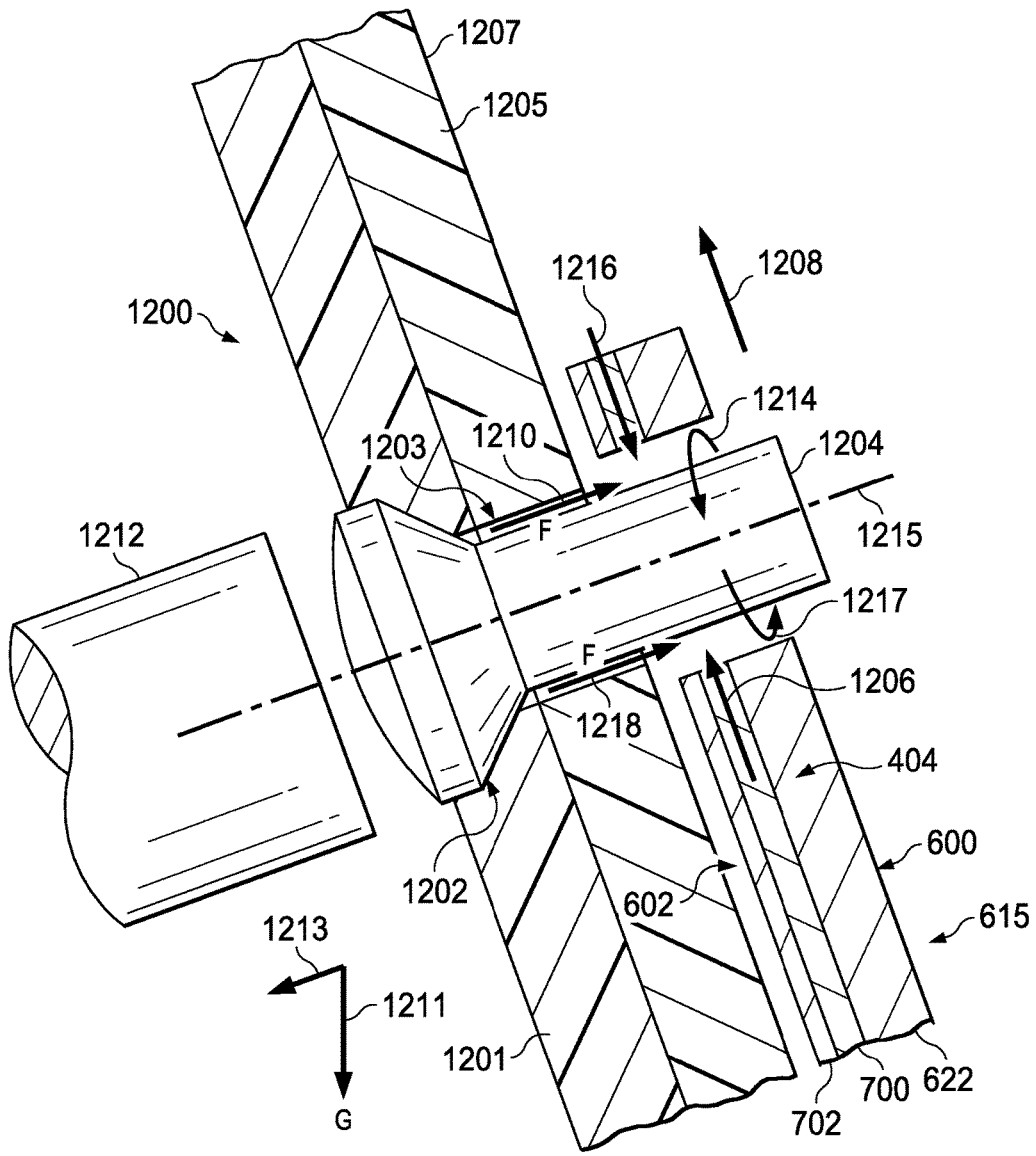
FIG. 12 is an illustration of a cross-sectional view of a fastener retention system positioned relative to a hole in which a fastener has been inserted in accordance with an illustrative embodiment.

With reference now to FIG. 12, an illustration of a cross-sectional view of fastener retention system 404 positioned relative to a hole in which a fastener has been inserted is depicted in accordance with an illustrative embodiment. In this illustrative example, structure 1200 of fuselage 306 is depicted with fastener 1202 inserted inside hole 1203 in structure 1200. Structure 1200 comprises first part 1201 and second part 1205. In one illustrative example, first part 1201 and second part 1205 may each be a skin panel.

In this illustrative example, air is flowing in selected direction 1206 out of fastener retention system 404 towards shaft 1204 of fastener 1202. Selected direction 1206 is substantially parallel to surface 1207 of structure 1200. Surface 1207 of structure 1200 may belong to second part 1205 in this illustrative example. In other illustrative examples, surface 1207 may be formed by the surfaces of both first part 1201 and second part 1205.

Further, selected direction 1206 is substantially perpendicular to shaft 1204 of fastener 1202. In particular, air blows out of fastener retention system 404 such that the air impinges on the exposed portion of shaft 1204 of fastener 1202. This exposed portion may be the portion of fastener 1202 that extends past surface 1207 of part 1205. This air pushes shaft 1204 of fastener 1202 up against the wall of hole 1203 in the direction of arrow 1208, thereby creating friction force 1210 between fastener 1202 and hole 1203.

Further, directing the air in selected direction 1206 at shaft 1204 of fastener 1202 creates torsional force 1214, which is counteracted by structure 1200, as indicated by arrow 1217.

Friction force 1210 may be sufficient to counteract the force of gravity 1211 that pulls down on fastener 1202. In one illustrative example, gravity 1211 may be broken out into two vector components. For example, component 1213 and another vector component of gravity 1211 (not shown) may together form gravity 1211. Component 1213 of gravity 1211 runs substantially parallel to centerline 1215 of hole 1203. Friction force 1210 is created substantially parallel to centerline 1215 of hole 1203. Friction force 1210 is created such that friction force 1210 is equal to or greater than component 1213 of gravity 1211. In this manner, friction force 1210 counteracts component 1213 of gravity 1211 to prevent fastener 1202 from slipping out of hole 1203.

In this manner, friction force 1210 may be sufficient to hold fastener 1202 in place within hole 1203 even when hammer 1212 is not positioned against the head of fastener 1202. Thus, fastener retention system 404 may be used to hold fastener 1202 in place within hole 1203 until a hammering operation and a bucking operation can be performed to fully install fastener 1202 to form a rivet.

In other illustrative examples, air may be directed at shaft 1204 of fastener 1202 in a direction that is not substantially perpendicular to shaft 1204. For example, without limitation, blowing compressed air out towards shaft 1204 in a direction slightly offset from a direction perpendicular to shaft 1204 may create sufficient friction force 1210 to counteract the pull of gravity 1211 that would cause fastener 1202 to slide out of hole 1203 in the absence of friction force 1210.

In some illustrative examples, plate system 615 may be reconfigured such that air is blown out of fastener retention system 404 in selected direction 1216. Blowing air in selected direction 1216 may cause friction force 1218 that is substantially parallel to centerline 1215 of hole 1203. Air may be directed at shaft 1204 of fastener 1202 to create friction force 1218 sufficient to counteract component 1213 of gravity 1211.

The illustrations in FIGS. 3-12 are not meant to imply physical or architectural limitations to the manner in which an illustrative embodiment may be implemented. Other components in addition to or in place of the ones illustrated may be used. Some components may be optional.

The different components shown in FIGS. 3-12 may be illustrative examples of how components shown in block form in FIGS. 1-2 can be implemented as physical structures. Additionally, some of the components in FIGS. 3-12 may be combined with components in FIG. 3-12, used with components in FIGS. 1-2, or a combination of the two.

Figure 13:
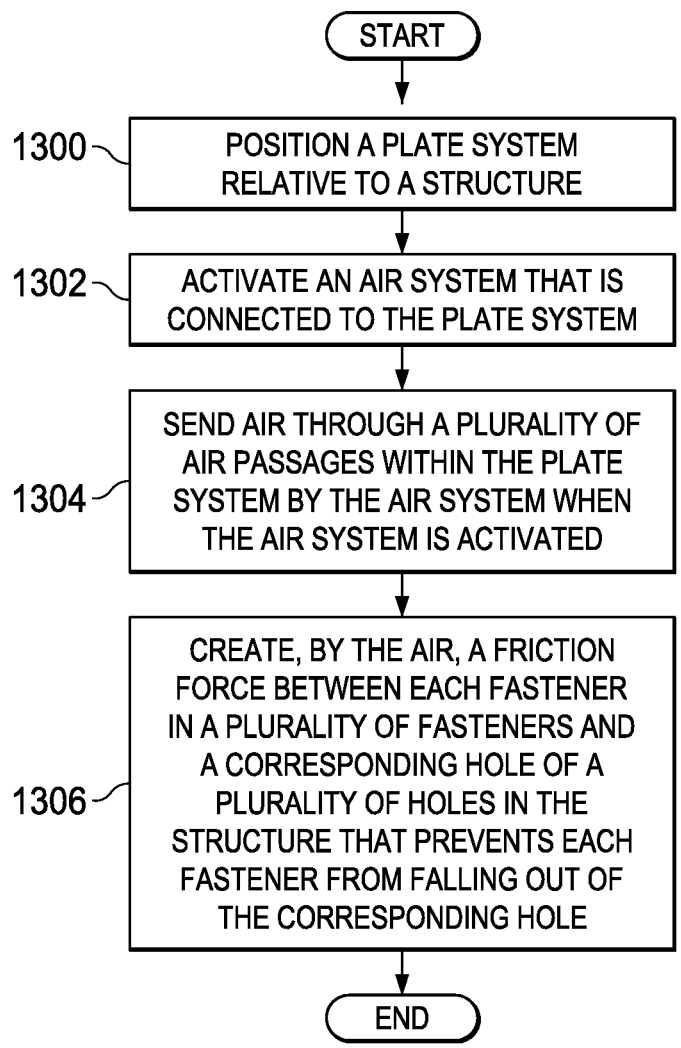
FIG. 13 is an illustration of a process for installing a fastener in the form of a flowchart in accordance with an illustrative embodiment.

With reference now to FIG. 13, an illustration of a process for installing a fastener is depicted in the form of a flowchart in accordance with an illustrative embodiment. The process illustrated in FIG. 13 may be implemented using fastener retention system 134 described in FIGS. 1-2.

The process may begin by positioning a plate system relative to a structure (operation 1300). In operation 1300, the structure may be a fuselage of an aircraft. An air system that is connected to the plate system may be activated (operation 1302). Air may be sent through a plurality of air passages within the plate system by the air system when the air system is activated (operation 1304). The air creates a friction force between each fastener in a plurality of fasteners and a corresponding hole of a plurality of holes in the structure that prevents each fastener from falling out of the corresponding hole (operation 1306), with the process terminating thereafter.

In particular, in operation 1306 the friction force prevents the plurality of fasteners from falling out of the plurality of holes during installation of the plurality of fasteners. In other words, the friction force holds the fastener within the hole between the time the fastener is placed in the hole and the time when the rivet is finally formed.

Figure 14:
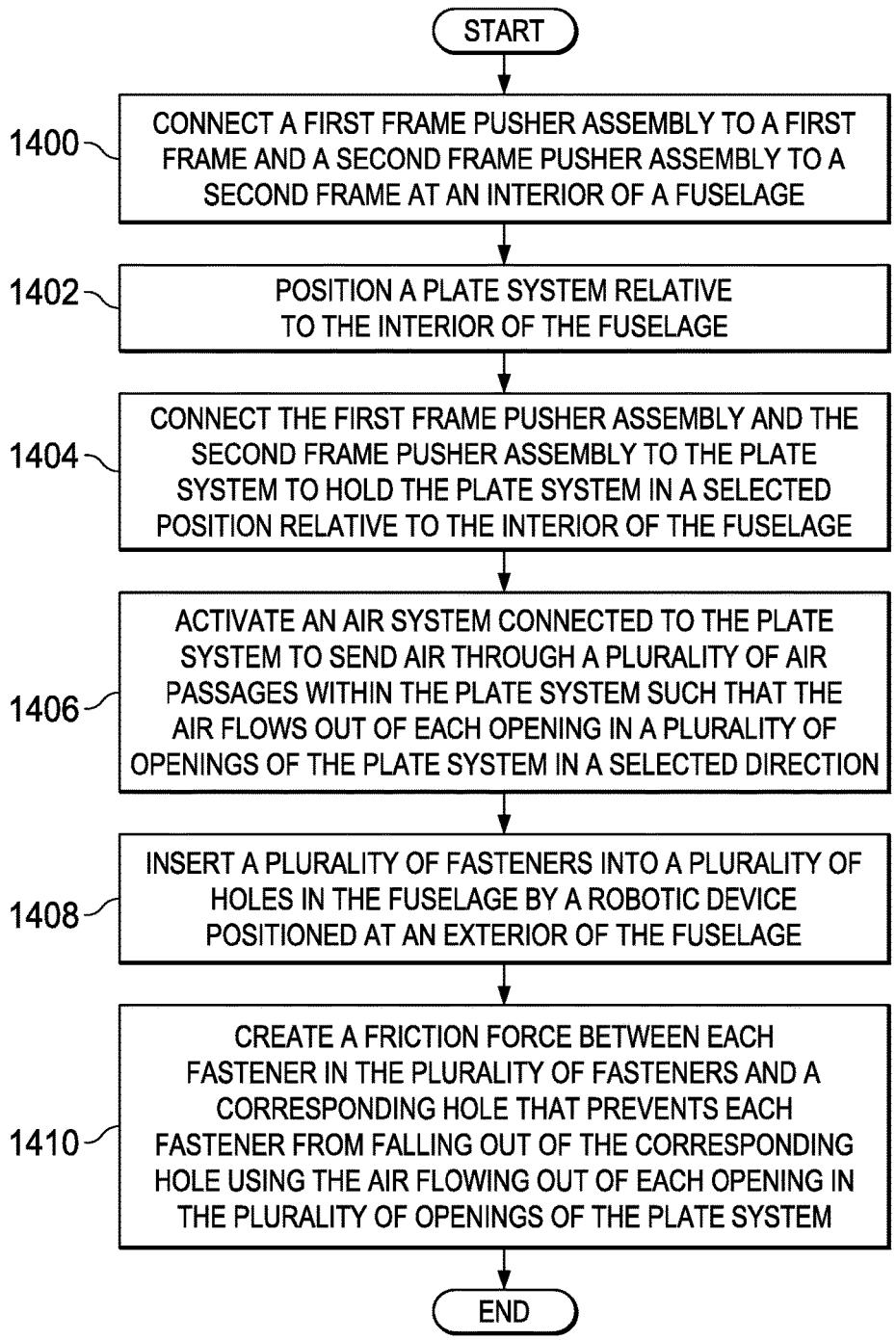
FIG. 14 is an illustration of a process for installing a fastener in the form of a flowchart in accordance with an illustrative embodiment.

With reference now to FIG. 14, an illustration of a process for installing a fastener is depicted in the form of a flowchart in accordance with an illustrative embodiment. The process illustrated in FIG. 14 may be implemented using fastener retention system 134 described in FIGS. 1-2.

The process may begin by connecting a first frame pusher assembly to a first frame and a second frame pusher assembly to a second frame at an interior of a fuselage (operation 1400). A plate system is positioned relative to the interior of the fuselage (operation 1402). The first frame pusher assembly and the second frame pusher assembly are connected to the plate system to hold the plate system in a selected position relative to the interior of the fuselage (operation 1404).

An air system connected to the plate system may be activated to send air through a plurality of air passages within the plate system such that the air flows out of each opening in a plurality of openings of the plate system in a selected direction (operation 1406). A plurality of fasteners may be inserted into a plurality of holes in the fuselage by a robotic device positioned at an exterior of the fuselage (operation 1408). The air flowing out of each opening in the plurality of openings of the plate system creates a friction force between each fastener in the plurality of fasteners and a corresponding hole that prevents each fastener from falling out of the corresponding hole (operation 1410), with the process terminating thereafter.

Figure 15:
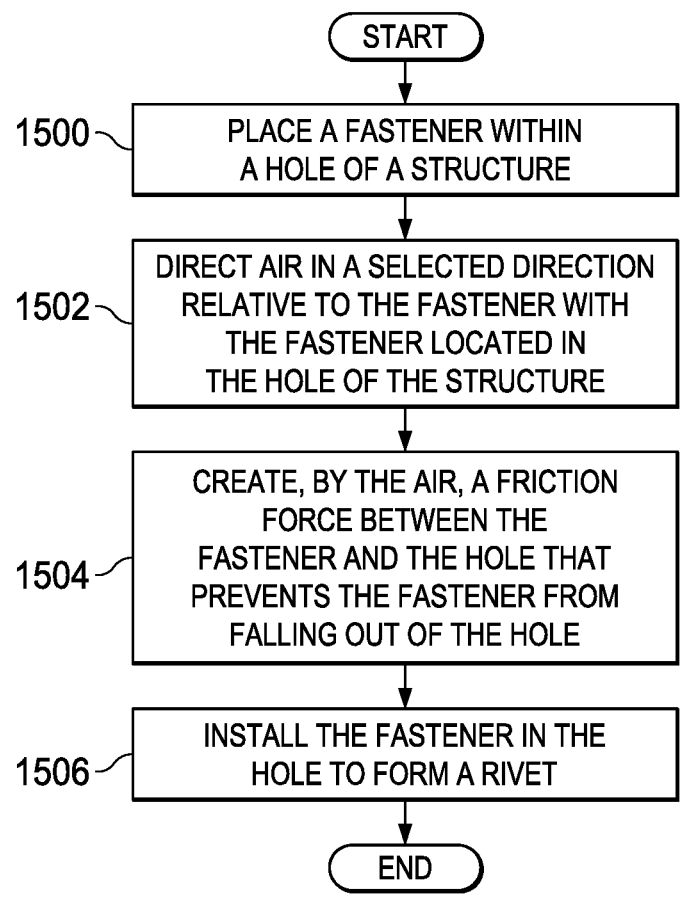
FIG. 15 is an illustration of a process for installing a fastener in the form of a flowchart in accordance with an illustrative embodiment.

With reference now to FIG. 15, an illustration of a process for installing a fastener is depicted in the form of a flowchart in accordance with an illustrative embodiment. The process illustrated in FIG. 15 may be implemented using fastener retention system 134 described in FIGS. 1-2.

The process may begin by placing a fastener within a hole of a structure (operation 1500). Air is directed in a selected direction relative to the fastener with the fastener located in the hole of the structure (operation 1502). The air creates a friction force between the fastener and the hole that prevents the fastener from falling out of the hole (operation 1504). Thereafter, the fastener is installed in the hole to form a rivet (operation 1506), with the process terminating thereafter.

Operation 1504 described above may be performed by directing the air such that the air impinges on a shaft of the fastener that is exposed at an interior of the structure. The air impinging on the shaft causes the faster to tilt toward a wall of the hole in the structure, thereby creating the friction force between the fastener and the wall of the hole. In particular, the friction force comprises a friction force component that is at least equal and opposite to the gravity component that pulls on the fastener.

Further, performing operation 1506 described above may include sending a number of commands to a robotic device to perform a riveting operation on the fastener located within the hole, while the friction force is being applied to the fastener. The riveting operation may include performing a hammering operation using the robotic device and a bucking operation using a tool held by a human operator.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 16:
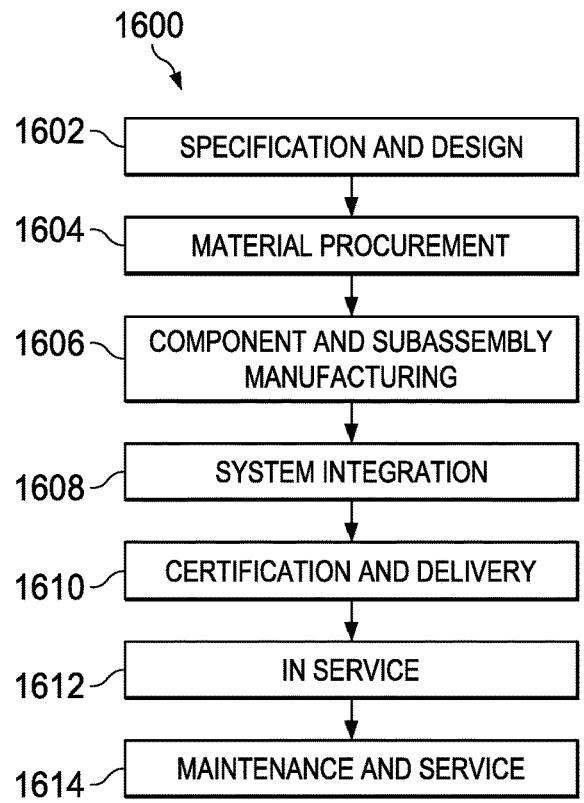
FIG. 16 is an illustration of an aircraft manufacturing and service method in the form of a block diagram in accordance with an illustrative embodiment.
Figure 17:
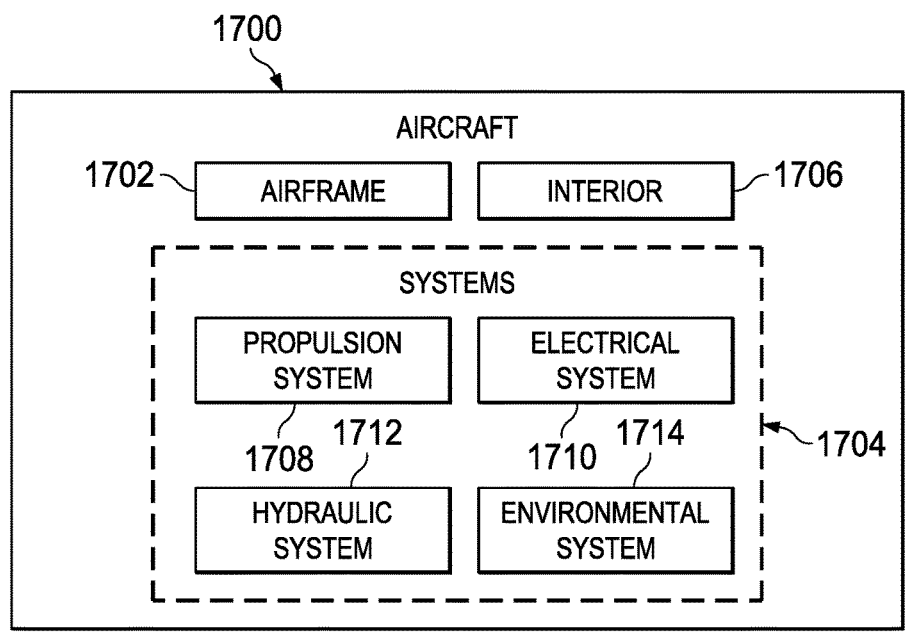
FIG. 17 is an illustration of an aircraft in the form of a block diagram in accordance with an illustrative embodiment.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During preproduction, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. In particular, plurality of fasteners 112 from FIG. 1 may be installed using fastener retention system 134 in FIG. 1 during any one of the stages of aircraft manufacturing and service method 1600. For example, without limitation, plurality of fasteners 112 from FIG. 1 using fastener retention system 134 in FIG. 1 may be installed during at least one of component and subassembly manufacturing 1606, system integration 1608, routine maintenance and service 1614, or some other stage of aircraft manufacturing and service method 1600. Further, plurality of fasteners 112 from FIG.

1 may be installed to build airframe 1702 of aircraft 1700 using fastener retention system 134 in FIG. 1.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612 and/or during maintenance and service 1614 in FIG. 16. The use of a number of the different illustrative embodiments may substantially expedite the assembly of and/or reduce the cost of aircraft 1700.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for installing a fastener, the method comprising:
   placing a fastener within a hole of a structure;
   directing air at a shaft of the fastener in a first direction relative to the shaft of the fastener with the fastener located in the hole of the structure thereby creating, by the air, a friction force between the fastener and the hole that prevents the fastener from falling out of the hole;
   directing air at the shaft of the fastener in a second direction relative to the shaft of the fastener thereby creating a torsional force on the fastener counteracted by the structure, wherein the first direction is different from the second direction; and
   installing the fastener in the hole.

2. The method of claim 1 further comprising:
   positioning a plate system relative to the structure.

3. The method of claim 2, wherein positioning the plate system comprises:
   aligning the plate system with a number of tack fasteners positioned around a plurality of holes in the structure.

4. The method of claim 2 further comprising:
   holding the plate system in a selected position relative to the structure using at least one frame pusher assembly.

5. The method of claim 2 further comprising:
   drilling, robotically, a plurality of holes in the structure with the plate system positioned relative to the structure.

6. The method of claim 2 further comprising:
   clamping up a selected region of the structure using the plate system positioned relative to an interior of the structure and a robotic device positioned relative to an exterior of the structure.

7. The method of claim 1, wherein creating, by the air, the friction force comprises:
   impinging, by the air, on an exposed portion of the shaft of the fastener.

8. The method of claim 7, wherein creating, by the air, the friction force comprises:
   tilting the shaft of the fastener toward a wall of the hole to create the friction force between the fastener and the wall of the hole.

9. The method of claim 1, wherein directing the air at the shaft of the fastener in the first direction comprises:
   sending the air from a compressed air source into a plurality of air passages within a plate system through a number of air connections attached to the plate system; and
   directing the air through the plurality of air passages and out of the plate system in the first direction at an opening of the plate system.

10. The method of claim 1 further comprising:
    inserting, robotically, the fastener in the hole in the structure.

11. The method of claim 1 further comprising:
    sending a number of commands to a robotic device to perform a riveting operation on the fastener located within the hole, while the friction force is being applied to the fastener.

12. The method of claim 1 further comprising:
    performing, by a robotic device positioned at an exterior of the structure, a riveting operation on the fastener located within the hole, while the friction force is being applied to the fastener; and
    maintaining the friction force while a bucking operation is performed at an interior of the structure.

13. A method for installing a fastener, the method comprising:
    placing a fastener within a hole of a structure;
    directing air at a shaft of the fastener in a first direction relative to the shaft of the fastener with the fastener located in the hole of the structure; thereby creating, by the air, a friction force between the fastener and the hole that prevents the fastener from falling out of the hole by impinging, by the air, on an exposed portion of the shaft of the fastener;
    directing air at the shaft of the fastener in a second direction relative to the shaft of the fastener thereby creating a torsional force on the fastener counteracted by the structure, wherein the first direction is different from the second direction; and
    installing the fastener in the hole.

14. The method of claim 13 further comprising:
    positioning a plate system relative to the structure.

15. The method of claim 14, wherein positioning the plate system comprises:
    aligning the plate system with a number of tack fasteners positioned around a plurality of holes in the structure.

16. The method of claim 14 further comprising:
    holding the plate system in a selected position relative to the structure using at least one frame pusher assembly.

17. The method of claim 13, wherein creating, by the air, the friction force comprises:
    tilting the shaft of the fastener toward a wall of the hole to create the friction force between the fastener and the wall of the hole.

18. The method of claim 13, wherein directing the air at the shaft of the fastener in the first direction comprises:
    sending the air from a compressed air source into a plurality of air passages within a plate system through a number of air connections attached to the plate system; and directing the air through the plurality of air passages and out of the plate system in the first direction at an opening of the plate system.

19. A method for installing a fastener, the method comprising:

placing a fastener within a hole of a structure;

directing air at a shaft of the fastener in a first direction relative to the shaft of the fastener with the fastener located in the hole of the structure thereby creating, by the air, a friction force between the fastener and the hole that prevents the fastener from falling out of the hole;

directing air at the shaft of the fastener in a second direction relative to the shaft of the fastener thereby creating a torsional force on the fastener counteracted by the structure, wherein the first direction is different from the second direction;

installing the fastener in the hole; and positioning a plate system relative to the structure.

20. The method of claim 19, wherein creating, by the air, the friction force comprises:

impinging, by the air, on an exposed portion of the shaft of the fastener.

\* \* \* \* \*